US012137054B1

(12) United States Patent
Filipov et al.

(10) Patent No.: US 12,137,054 B1
(45) Date of Patent: Nov. 5, 2024

(54) DYNAMIC RATE LIMITING OF INCOMING DATA STREAMS

(71) Applicant: VMware LLC, Palo Alto, CA (US)

(72) Inventors: Antonio Kristiyanov Filipov, Sofia (BG); Davor Roglic, Austin, TX (US); Ivan Dimitrov Duhov, Sofia (BG); Dimitar Veskov Petkov, Sofia (BG); Petar Penev, Sofia (BG)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/309,741

(22) Filed: Apr. 28, 2023

(51) Int. Cl.
*H04L 47/32* (2022.01)

(52) U.S. Cl.
CPC .................... *H04L 47/32* (2013.01)

(58) Field of Classification Search
CPC ............ H04L 63/145; H04L 63/1458; H04L 63/1491; H04L 63/20; H04L 67/10; H04L 67/51; H04L 67/5681; H04L 69/14; H04L 69/24; H04L 69/329; H04L 9/40; H04L 1/16; H04L 1/1671; H04L 1/1822; H04L 1/1848; H04L 12/1881; H04L 12/2854; H04L 12/4633; H04L 12/4641; H04L 12/5602; H04L 12/66; H04L 2012/5636; H04L 2012/5648; H04L 2012/5681; H04L 41/0896; H04L 41/16; H04L 43/022; H04L 43/087; H04L 47/15; H04L 47/22; H04L 47/2416; H04L 47/2441; H04L 47/2458; H04L 47/263; H04L 47/30; H04L 47/31; H04L 47/326; H04L 49/1576; H04L 5/001; H04L 5/0044; H04L 5/0048; H04L 5/0053; H04L 5/0092; H04L 43/16; H04L 65/612; H04L 65/80; H04L 43/0888; H04L 47/10; H04L 47/18; H04L 1/0003; H04L 41/12; H04L 41/5009; H04L 43/0817;
(Continued)

(56) References Cited

U.S. PATENT DOCUMENTS 6,310,857 B1 * 10/2001 Duffield ............. H04Q 11/0478
370/232
7,177,271 B2 * 2/2007 Shao ....................... H04L 47/15
370/395.2
(Continued)

OTHER PUBLICATIONS

Unknown, "Class GetRecordsResult", Amazon Web Services, Inc., copyright 2023, captured Apr. 23, 2023, https://docs.aws.amazon.com/AWSJavaSDK/latest/javadoc/com/amazonaws/services/kinesis/model/GetRecordsResult.html, 8 pages.

*Primary Examiner* — Djenane M Bayard
(74) *Attorney, Agent, or Firm* — King Intellectual Asset Management

(57) ABSTRACT

The rate of incoming data records in a data stream is dynamically limited based on stream delay. A current delay representing a latency between a beginning of the data stream and a currently processed data record is obtained. A maximum delay representing a maximum tolerated delay is determined. A threshold delay representing a delay value that triggers calculation of a new drop rate is determined. A drop rate is calculated based on the current delay, the maximum delay, and the threshold delay. The drop rate represents a percentage of the incoming data records. A drop strategy is selected. One or more data records are discarded from the incoming data stream based on the drop rate, according to the drop strategy.

20 Claims, 8 Drawing Sheets

(58) Field of Classification Search
CPC ..... H04L 43/0829; H04L 43/10; H04L 47/32;
H04L 65/60; H04L 67/101; H04L 67/104;
H04L 1/1825; H04L 1/1893; H04L
12/1863; H04L 2212/00; H04L 41/0627;
H04L 41/0631; H04L 41/0668; H04L
41/145; H04L 41/147; H04L 41/149;
H04L 41/5025; H04L 43/0823
See application file for complete search history.

(56) References Cited

U.S. PATENT DOCUMENTS

| | | | |
|---|---|---|---|
| 11,075,984 B1* | 7/2021 | Mercier | H04L 43/20 |
| 11,115,284 B1* | 9/2021 | Paiva | H04L 67/5682 |
| 2003/0118112 A1* | 6/2003 | Son | H04N 19/42 |
| | | | 375/E7.093 |
| 2007/0150114 A1* | 6/2007 | Gardner | H02J 3/08 |
| | | | 700/286 |
| 2015/0058556 A1* | 2/2015 | Hamedani | G06F 3/064 |
| | | | 711/114 |

* cited by examiner

DYNAMIC RATE LIMITING OF INCOMING DATA STREAMS

BACKGROUND

A common challenge in data streaming is processing delay, which is caused by different factors such as network congestion, sluggish processors, or backpressure from downstream processors. Backpressure happens when data is processed through a data stream at a pace that exceeds the consumption rate of downstream processors. This can result in higher latency and potential loss of data.

Conventional rate limiting implementations do not solve these technical problems associated with processing delay in data streams, at least because conventional implementations merely define a constant output rate and required storage of unprocessed data. Conventional approaches do not provide a flexible and resilient solution to the technical problem.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure prevent backpressure from downstream processors by dynamic rate limiting of an incoming data stream based on stream delay. An incoming data stream comprising a plurality of data records is received. A current delay representing a latency between a beginning of the incoming data stream and a currently processed data record is obtained. A maximum delay representing a maximum tolerated delay is determined. A threshold delay representing a delay value that triggers a calculation of a drop rate is determined. A drop rate is calculated based on the current delay, the threshold delay, and the maximum delay. The drop rate represents a percentage of the incoming data stream. A drop strategy is selected. One or more data records are discarded from the incoming data stream based on the drop rate, according to the drop strategy.

BRIEF DESCRIPTION OF THE DRAWINGS

The present description will be better understood from the following detailed description read in the light of the accompanying drawings, wherein:

Corresponding reference characters indicate corresponding parts throughout the drawings. In FIGS. 1 to 8, the systems are illustrated as schematic drawings. The drawings may not be to scale. Any of the figures may be combined into a single example or embodiment.

DETAILED DESCRIPTION

Figure 1:
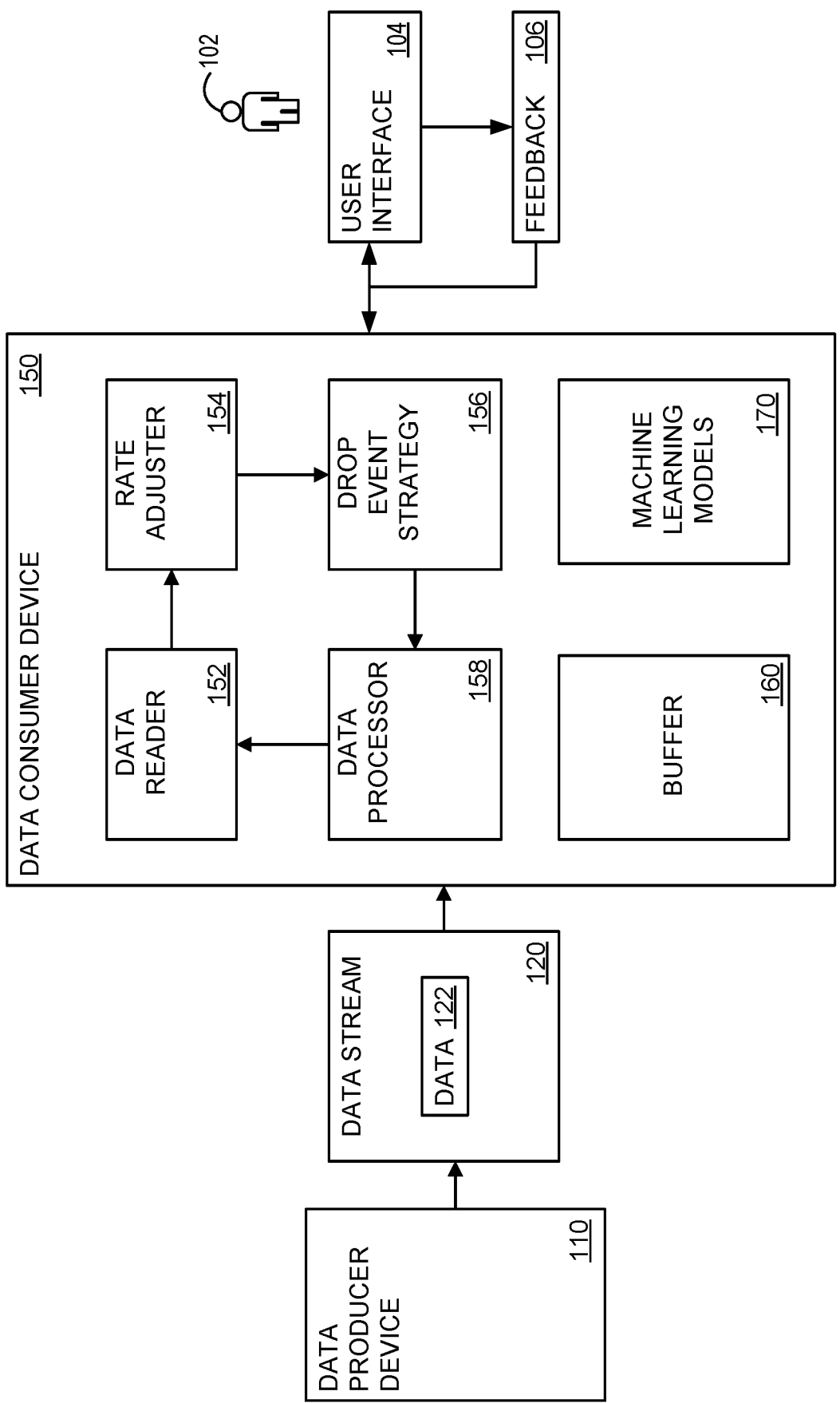
FIG. 1 illustrates an example architecture that advantageously provides for dynamic rate limiting.

A data stream is a continuous flow of data records that are generated over time and in a sequential manner. The data records may be generated from various sources and in various formats and volumes. The data records may be generated from sensors, social media feeds, transactional databases, system logs, storage devices, Internet of Things (IoT), and other real-time sources. Data streaming is gaining popularity due to the surging need for real-time, big data analytics. Through data streaming, new data may be continuously generated and transferred at a high-speed.

As opposed to standard batch processing, which involves processing a large volume of data in a batch, data streams are processed in real-time or near-real-time, as soon as the data is generated. This makes data streams particularly useful in applications that require timely analysis of data. However, due to this real-time or near-real-time processing, data streams must deal with specific challenges, such as processing delay and backpressure from downstream processors.

Since a data stream is transferred from data producers to data consumers, delays due to backpressure may arise when data consumers cannot process data fast enough to keep up with the speed of the data stream (e.g., a rate of the events or records in the stream). Data consumers may have limited processing power, such that only a certain number of records or bytes can be processed in a given time period. While the data producers continuously produce data and the produced data continuously flows into the data stream to the data consumer, there is no guarantee that a data consumer can process the incoming data at the same rate as the data flow from the data producers. In such cases, processing of the data from the data stream is delayed. The delay presents a technical problem because the data stream is typically used for systems and applications that require real-time data processing. Due to the processing delay, some time-sensitive data may not be processed in time; thus, the timeliness and reliability of the time-sensitive applications may be impaired or degraded.

Conventional traffic management algorithms, such as the Leaky Bucket method or the Token Bucket method, do not adequately address this technical problem. For example, the Leaky Bucket method only imposes a maximum rate at which data can be transmitted over the data stream without considering the processing delay. As data flows into the "bucket," it is held there until it can be transmitted and any excess data would spill out of the "bucket." Accordingly, this conventional method leads to loss of valuable data when there is processing delay. In addition, the Leaky Bucket method may introduce even longer delay and latency as some data records may be held in the "bucket" until there is sufficient room to transmit them. This negatively affects time-sensitive applications. This conventional approach also requires a larger memory footprint, as the unprocessed data needs to be stored. In addition, there is no filtering mechanism to select the data to be processed. Accordingly, the conventional implementations cannot control the rate in a reliable, resilient, and desirable way.

In contrast, aspects of the disclosure provide a practical, technical solution to the technical problem of processing data streams. Aspects of the disclosure dynamically adjust the rate of data processing based on a delay in the data stream. A drop rate is dynamically calculated based on a current delay of the data stream, and the drop rate is used to limit the incoming data flow. As data records, or events, come into the data consumer from the data stream, if processing is currently delayed, some data records get dropped according to the dynamically calculated rate. This approach deals with the delay flexibly based on the current state of data processing in the data stream at the data consumer. Therefore, the data consumer is ensured to have access to the most recent, real-time data, in addition to preventing data processing from being delayed more than a maximum tolerated delay.

Aspects of the disclosure also improve operational efficiency, reduce computing recourses, and increase reliability and safety of systems and devices. Aspects of the disclosure provide a computationally cost-effective approach because the incoming data records are filtered or sampled based on significance, popularity, or any other criteria. This provides another technical advantage of the dynamic rate limiting because the most significant and valuable data records do not get delayed but are processed immediately. The data consumer device processes only significant events and do not waste computing resources on dropped events that would have added no new knowledge or value. The data consumer device saves computing recourses and improves performance when a data record that adds no new knowledge or value is dropped. In addition, because data records are dropped, instead of buffered, aspects of the disclosure do not require a large memory footprint at either the data producer, an intermediate buffer, or the data consumer.

Aspects of the disclosure may be particularly useful for time-sensitive applications and systems. For example, anomaly detection at the edge of a network requires real-time analysis to identify unusual or abnormal patterns on data generated by sensors, Internet of Things (IoT) devices, and/or other devices. Processing delay can be dire in anomaly detection because the data is very time-sensitive. Accordingly, anomaly detection at the edge advantageously benefits from the dynamic rate limiting disclosed herein to process data in real-time. For example, aspects of the disclosure are applicable to endpoint detection and response (EDR), which provides real-time monitoring and threat detection at the endpoint level, such as desktops, laptops, servers, and mobile devices. EDR requires continuous monitoring of system activities and network traffic and detecting threats in real-time, such as by processing millions of events per second in a streaming fashion. The methods and systems described herein may be practically applied to an EDR system to provide customers the ability to proactively search for potential security threats in real-time (e.g., without delay). However, aspects of the disclosure are not limited to anomaly detection at the edge, but also may be applied to data streamlining in general.

FIG. 1 illustrates an example architecture 100 that advantageously provides for dynamic data flow rate adjusting. FIG. 1 describes the flow of data between the producer and consumer and the underlying processing on the consumer side. Architecture 100 comprises a data producer device 110, which generates data 122 and supplies the data 122 through a data stream 120. The data producer device 110 may be any type of device that produces data events or record into a data stream. The data producer device 110 may be a sensor, transactional database, cloud, IoT, network device, and other real-time source. The data producer device 110 may be a virtual computing device (e.g., virtual machine) or a physical computing device. The data producer device 110 may produce the data stream 120. The data producer device 110 may be multiple data producer devices, each writing different data into the data stream 120. The data producer device 110 pushes the data 122, which comprises a plurality of data records, events, messages, or other data, into the data stream 120.

In some embodiments, the data stream 120 stores the data 122 in various formats according to the data type and attaches a timestamp or "date created" tag to each data record in the data 122, such that the age of each data record in the data 122 can be tracked. In some embodiments, the data stream 120 works as a buffer and stores the data 122 and provides a feedback loop, by allowing consumers to pull the data 122 at some interval. The data 122 may comprise any type of data record, event, and/or message. The data stream 120 provides the data 122 to a data consumer device 150, which processes the data 122.

In some embodiments, the data stream 120 may be any available data stream service, such as Amazon Kinesis from Amazon Web Services (AWS), Apache Kafka, Google Cloud Pub/Sub, Microsoft Azure Event Hubs, Apache Pulsar, etc. The data stream 120 are not limited to these data streaming services and these services are listed as examples only.

In some embodiments, the data stream 120 includes functionality to identify the current delay to the data consumer device 150. As the data 122 is pulled from the data stream 120 to the data consumer device 150, the data consumer device 150 receives the current delay. For example, when the data 122 is pulled from the data stream 120, the current delay is calculated by subtracting the age of the oldest event (or input timestamp) from the current time (or output timestamp) where the data stream 120 is a First-In-First-Out (FIFO) stream. Alternatively, in case of a Last-In-First-Out (LIFO) stream, the current delay is calculated by subtracting the current time (or output timestamp) from the age of the oldest event (or input timestamp).

The data consumer device 150 may be any type of computing device, and may comprise a processor, or multiple processors, to process the incoming data 122. The data consumer device 150 may be a user device, such as a mobile computing device, personal computer, server computer, hand-held or laptop device, multiprocessor system, and/or network PC. The data consumer device 150 may be a virtual computing device (e.g., virtual machine) or a physical computing device. In some embodiments, the data consumer device 150 comprises a data reader 152 to read the data 122 from the data stream 120. In some embodiments, the data consumer device 150 comprises a rate adjuster 154, which determines a drop rate in case of a delay. In some embodiments, the data consumer device 150 comprises a drop event strategy 156, which strategically selects some data records from the data 122 to process, and others to drop or discard. In some embodiments, the drop event strategy 156 may filter the data 122 to select only significant and relevant data records from the data 122. The data consumer device 150 comprises a data processor 158 that processes the data 122 (e.g., only the data filtered by the drop event strategy 156).

In some embodiments, the data consumer device 150 further comprises a machine learning (ML) models 170. The ML models 170 may be employed in connection with the rate adjuster 154 to dynamically determine parameters, such as a threshold delay and a maximum tolerated delay. The ML models 170 may be used by the drop event strategy 156 to select data records to process. Further details of the ML models 170 are described with reference to FIG. 2 and FIG. 3 herein.

In some embodiments, the data consumer device 150 receives input from a user 102 through a user interface 104. The user 102 may provide feedback 106 to the data consumer device 150 on the current delay, processing rate, drop strategy, etc. The feedback 106 may be analyzed to further train the ML models 170. In some embodiments, the data consumer device 150 and the user interface 104 are separate devices. In some embodiments, the consumer device 150 and the user interface 104 are integrated in a single device.

In some embodiments, the data consumer device 150 comprises a buffer 160. Some data records in the data 122 may be directed to the buffer 160, while some data records in the data 122 are processed immediately. In some embodiments, the data 122 may be temporarily stored in the buffer 160 instead of being immediately processed. The buffer 160 may be a virtual machine or non-virtual machine. The buffer 160 may be a separate device, or integrated into the data consumer device 150. Further details of the buffer 160 are described with reference to FIG. 3 herein.

In some embodiments, the data consumer device 150 experiences a propagation delay. For example, the data producer device 110 generates 100 records per second in the data stream 120, while the data consumer device 150 consumes up to 50 records per second. The consumer device 150 thus will get behind the data stream 120, which means the data 122 may be delayed to the user 102 or an analytics application executing on the consumer device 150. The propagation delay (e.g., a processing delay) may be measured by measuring time from the moment a data record is written to the data stream 120 until it is read by the data consumer device 150. The propagation delay may indicate the time required for an event to be delivered to the data consumer device 150. The propagation delay includes a processing delay, in some examples. The processing delay may also be measured as a latency from the beginning of the data stream 120 to the most recently processed data record. The processing delay depends on multiple factors. In some embodiments, the processing delay depends on the throughput of the data consumer device 150. The data processor 158 is the component that gets throttled, and the data reader 152 is not able to poll data from the data stream 120 at a desired rate. To decrease the level of throttling of the data processor 158, the drop event strategy 156 may employ a method to discard some of the data 122 and sending the other data to the data processor 158. The rate adjuster 154 calculates a drop rate based on the current delay, threshold delay, and maximum delay. In some embodiments, the data stream 120 provides the propagation delay value therein. The data stream 120 may be configured to send a notification to the data consumer devices 150 that an event is processed by the data consumer device 150, and after receiving such notification, the data consumer device 150 can initiate a new data pull request.

In some embodiments, the data processor 158 processes statistical samples of the data 122, or a subset of the data 122, instead of the complete set of the data 122 pushed through the data stream 120, and may still achieve the desired result. In some embodiments, the data processor 158 includes business logic, algorithms, and/or processes that require the most current data from the data producer device 110 in real-time or near real-time.

Figure 2:
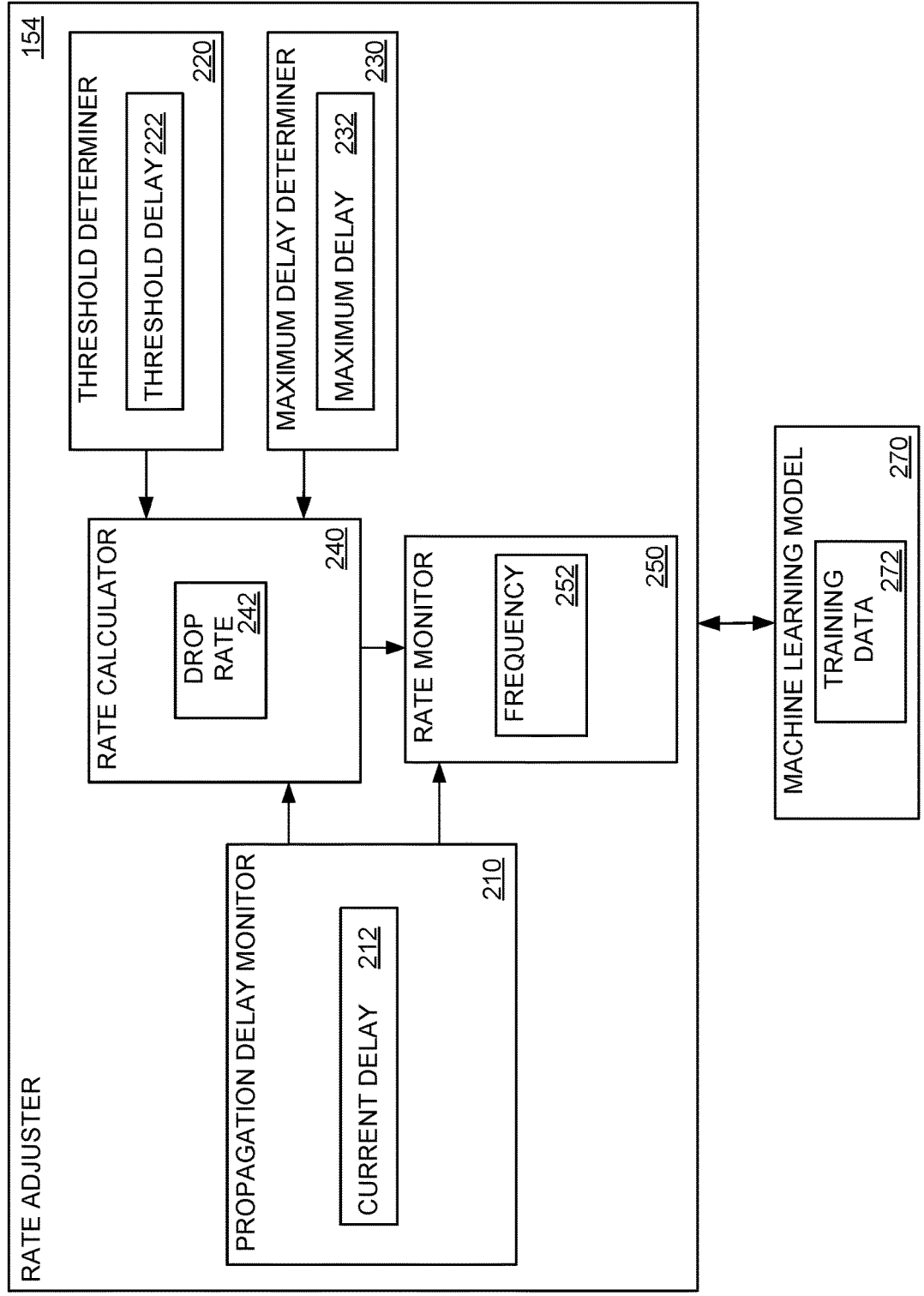
FIG. 2 illustrates an example architecture that advantageously provides for dynamic rate calculation, as may be used in an architecture such as that of FIG. 1.

FIG. 2 illustrates an example architecture 200 that advantageously provides for dynamic rate calculation, as may occur when using examples of architecture 100. In some embodiments, to dynamically control the rate of data processing, the rate adjuster 154 dynamically calculates a rate based on current state of the data consumer device 150 and data stream 120.

In some embodiments, the rate adjuster 154 comprises a propagation delay monitor 210. The propagation delay monitor 210 monitors the current state of data processing of the data consumer device 150 and the data stream 120. The propagation delay monitor 210 estimates a current delay 212 by measuring the time it takes for a data record from being written to the data stream 120 to being read by the data consumer device 150. The current delay 212 represents a latency from when a data record is written to the data stream 120 until the data record is read by the data reader 152. The current delay 212 also indicates how far the currently processed data record is from the tip of the data stream 120. The current delay 212 may be monitored continuously or updated periodically. In some embodiments, the propagation delay monitor 210 receives the current delay 212 from the data stream 120, which includes a functionality to provide the current delay 120. The data stream 120 is configured to provide a time value (e.g., number of milliseconds) between the currently processed data record and the beginning of the data stream 120. For example, Amazon Kinesis Data Streams provides getMillsBehindLatest( ) method that returns the number of milliseconds the GetRecords response is from the tip of the stream, indicating how far behind current time the consumer is. Other data stream services may include similar functionalities to provide the current delay 212.

In some embodiments, the rate adjuster 154 comprises a threshold determiner 220, which determines a threshold delay 222. The threshold delay 222 represents a delay value which, if exceeded, triggers the rate adjuster 154 to calculate a new drop rate. In some embodiments, the threshold delay 222 is compared to the current delay 212, and if the current delay 212 exceeds the threshold delay 222, a new drop rate is calculated. In some embodiments, the threshold determiner 220 receives an input from the user 102 through the user interface 104, and uses the input to set the threshold delay 222. In some embodiments, a ML model 270, which is a part of ML models 170, is used to set the threshold delay 222, based on the historical drop rates, a delay trend, and/or currently available memory and processing power. The ML model 270 is trained on training data 272 to determine the threshold delay 222. Further details on the ML model 270 estimating the threshold delay 222 are illustrated and described with reference to FIG. 7.

The rate adjuster 154 comprises a maximum delay determiner 230, which determines a maximum delay 232. The maximum delay 232 represents the maximum delay that the data consumer device 150 tolerates. In some embodiments, when the maximum delay 232 is reached, the data consumer device 150 stops reading new data records and drops all the incoming data. In some embodiments, the maximum delay determiner 230 receives an input from the user 102 through the user interface 104, and uses the input to set the maximum delay 232. In some embodiments, the maximum delay determiner 230 determines the maximum delay 232 based on the current state of the data processor 158, the specific architecture of the data processor 158, and the complexity of the instructions performed by the data processor 158, algorithm and process performed by the data processor 158, etc. In some embodiments, stress tests are run on the data processor 158 to determine the maximum delay 232. In some embodiments, the maximum delay determiner 230 analyzes the system logs and performance metrics to determine the maximum delay 232. In still other embodiments, the ML model 270 trained on training data 272 is used to determine the maximum delay 232.

The rate adjuster 154 further comprises a rate calculator 240, which calculates a drop rate 242 based on the current delay 212, threshold delay 222, and maximum delay 232. When the processing speed of the data consumer device 150 is slower than the data pushing rate of the data stream 120, the current delay 212 exceeds the threshold delay 222. The rate calculator 240 calculates a drop rate 242, and the data consumer device 150 starts discarding data at the calculated drop rate 242 until the current delay 212 falls under the threshold delay 222.

In some embodiments, the drop rate 242 is calculated according to the formula:

$$\text{rate} = \max\left(0, \min\left(1, \frac{(\text{Current\_delay} - \text{threshold\_delay})}{(\text{Max\_delay} - \text{threshold\_delay})}\right)\right)$$

wherein current_delay refers to the current delay 212, or a latency between the currently processed record and the tip of the data stream, threshold_delay refers to the threshold delay 222, or a point if reached, a new rate is to be calculated, and max_delay refers to the maximum delay 232, or the maximum tolerated delay.

In some embodiments, the drop rate 242 represents a percentage of incoming data records that will be dropped from the data consumer device 150. Applying this mechanism would prevent downstream processors from being delayed by more than the maximum tolerated delay 232. For example, if current_delay is 12 minutes, threshold_delay is 10 minutes, and max_delay is 15 minutes, a new drop rate is calculated because current_delay is greater than threshold_delay. The new drop rate is calculated according to the above formula:

$$\text{rate} = \max\left(0, \min\left(1, \frac{(12-10)}{(15-10)}\right)\right)$$

For this example, the drop rate is 40%. If the number of incoming data records is 100, the number of data records to be dropped is the number of incoming data records multiplied by the drop rate, 100×0.4, which is 40.

In another example, current_delay is 15 minutes, threshold_delay is 10 minutes, and max_delay is 15 minutes. Because current_delay is equal to max_delay, all of the incoming data records are dropped at this time. The drop rate is 100%, which means 100% of the incoming data records will be dropped.

The rate adjuster 154 further comprises a rate monitor 250, which monitors the drop rate 242. The rate monitor tracks the current delay 212 and adjusts a frequency 252 of how often the drop rate 242 should be calculated based on the fluctuation of the current delay 212. For example, if the current delay 212 keeps increasing, the frequency 252 is set high such that the drop rate 242 is calculated more frequently. If the current delay 212 is decreasing, the frequency 252 is adjusted such that the drop rate 242 is calculated less frequently. Additionally, or alternatively, the rate monitor checks if the drop rate 242 fluctuates and determines the frequency 252 based on the amount of change in the drop rate 242 between two consecutive rate calculations. If the drop rate 242 seems mostly steady, the time between drop rate calculations may increase. In some embodiments, the user 102 sets the frequency 252. In some embodiments, the frequency 252 is set at a fixed value (e.g., every 5 minutes) initially.

Figure 3:
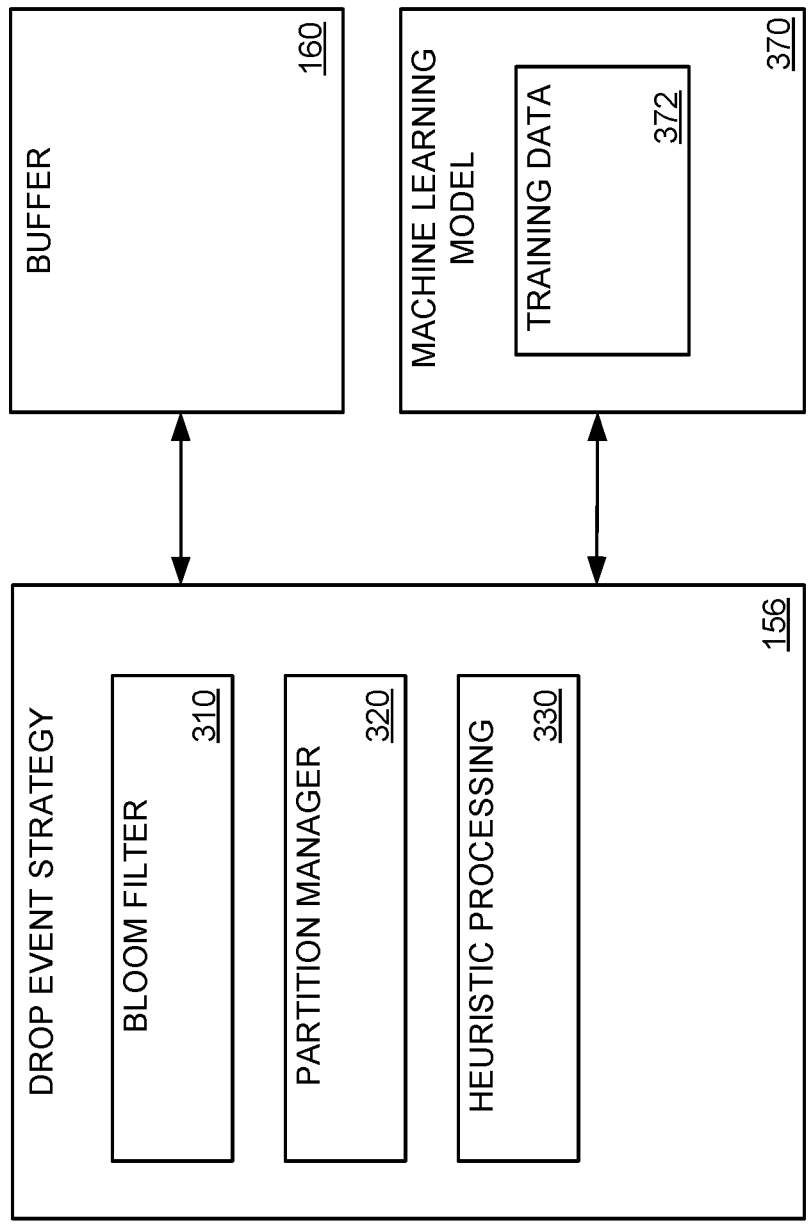
FIG. 3 illustrates examples of drop event strategies, as may be used in an architecture such as that of FIG. 1.

FIG. 3 illustrates drop event strategies as may be used when using examples of architecture 100. Different methods may be implemented to keep up with the incoming data. In some embodiments, incoming data may be discarded at a calculated rate, such that the discarded data record count is equal to the number of incoming data multiplied by the calculated rate. In some embodiments, the delayed data may be buffered and processed in batches. In some other embodiments, the incoming data may be partitioned and processed by multiple processors. In some embodiments, the user 102 determines which method to implement to speed up the processing on the data consumer device 150. In still other embodiments, a trained ML model 370, a part of ML models 170, may determine which method is the most suitable based on the current delay, characteristics of the incoming data records, and/or process and algorithms performed by the data consumer device 150.

Some data records, or events, may require no computation, whereas some other data records, or events, may require extensive computation and processing. The data records that require more processing are more likely to incur longer delay. Processing delay also depends on type of business logics, algorithms, and/or other processes performed by data consumers. Depending on the type of processing, different data consumers may experience delays differently, even with same data records.

In some embodiments, the data consumer device 150 uses the drop strategy 156 to discard some of the incoming data records. Different methods may be employed in order to efficiently and effectively drop some of the events such that the data consumer device 150 can process the most current data without losing valuable data. The best method to address the processing delay in each case may be determined based on the type of the incoming data, characteristics of the incoming data records, and/or process and algorithms performed by the data consumer device. For example, in some embodiments, the drop strategy 156 randomly selects some of the incoming data records to be discarded. In some other embodiments, the drop strategy 156 uses a filter or heuristics to select data records to be processed. In some embodiments, a trained model, such as the ML model 370, may be used to select the least valuable data records to be discarded. The ML model 370 may be a different ML model from the ML model 270. The ML model 370 is trained on training data 372. In some embodiments, the data consumer device 150 may receive preferred methods indicated by the user 102. In some embodiments, a method is selected dynamically by a trained model based on the data type of the incoming data, characteristics of the incoming data records, and/or process and algorithms performed by the data consumer device.

In some embodiments, the drop strategy 156 comprises a bloom filter 310, which determines significance of the data. The bloom filter 310 is a probabilistic data structure that can quickly and efficiently determine if a data record, or an event, should be dropped or processed. The bloom filter 310 may be built using any criteria, such as frequency of event, popularity of event, and/or significance of event. In some embodiments, the bloom filter 310 works by using a set of hash functions. In some embodiments, the bloom filter 310 determines significance of a data record based on statistical data. Less significant data records are more likely to be dropped such that dropping data records has minimal impact on the business logic. Additionally, or alternatively, the bloom filter determines popularity of an event, and the degree of the popularity is used to determine whether to drop or process the event. For example, frequently occurring events are more likely to be dropped than rarely occurring events. The bloom filter 310 may filter the incoming data records, select representative data records, and generate a sample set with the selected data records.

In some embodiments, the drop event strategy 156 comprises a partition manager 320, which divides incoming data records into multiple partitions. In some embodiments, the drop strategy 156 may choose to divide the incoming data records into multiple partitions using the partition manager 320 and process them by multiple processors instead of discarding a portion of the incoming data records. In some embodiments, the drop event strategy 156 stores all incoming data records in the buffer 160 as the data consumer device 150 reads the data records. In some embodiments, the drop event strategy 156 uses the bloom filter 310 and/or the heuristic processing 330 to select data records to be processed, and uses the buffer 160 to temporarily store the remainder of the incoming data records. In some embodiments, the data records stored in the buffer 160 are processed in batches. In some embodiments, the partition manager 320 divides the data records stored in the buffer 160 and distributes them to multiple processors. In some embodiments, the partition manager 320 uses the bloom filter 310 and/or the heuristic processing 330 to distribute the data records to the multiple processors based on the significance and/or characteristics of the data records.

In some embodiments, the drop event strategy 156 comprises a heuristic processing 330, which selects which data records, or events, to process. The heuristic processing 330 quickly and efficiently analyzes the data structure and characteristics of incoming events to select events to be processed. In some embodiments, the heuristic processing 330 selects events based on their size, type, complexity, and/or data structure. In some embodiments, the heuristic processing 330 selects events based on frequency of the event. In other embodiments, the machine learning model 370 may be used to determine the significance of the data records. In still other embodiments, the heuristic processing 330 includes statistical models to analyze the incoming data records. Heuristic processing 330 may generate statistical samples of the incoming data records.

Figure 4:
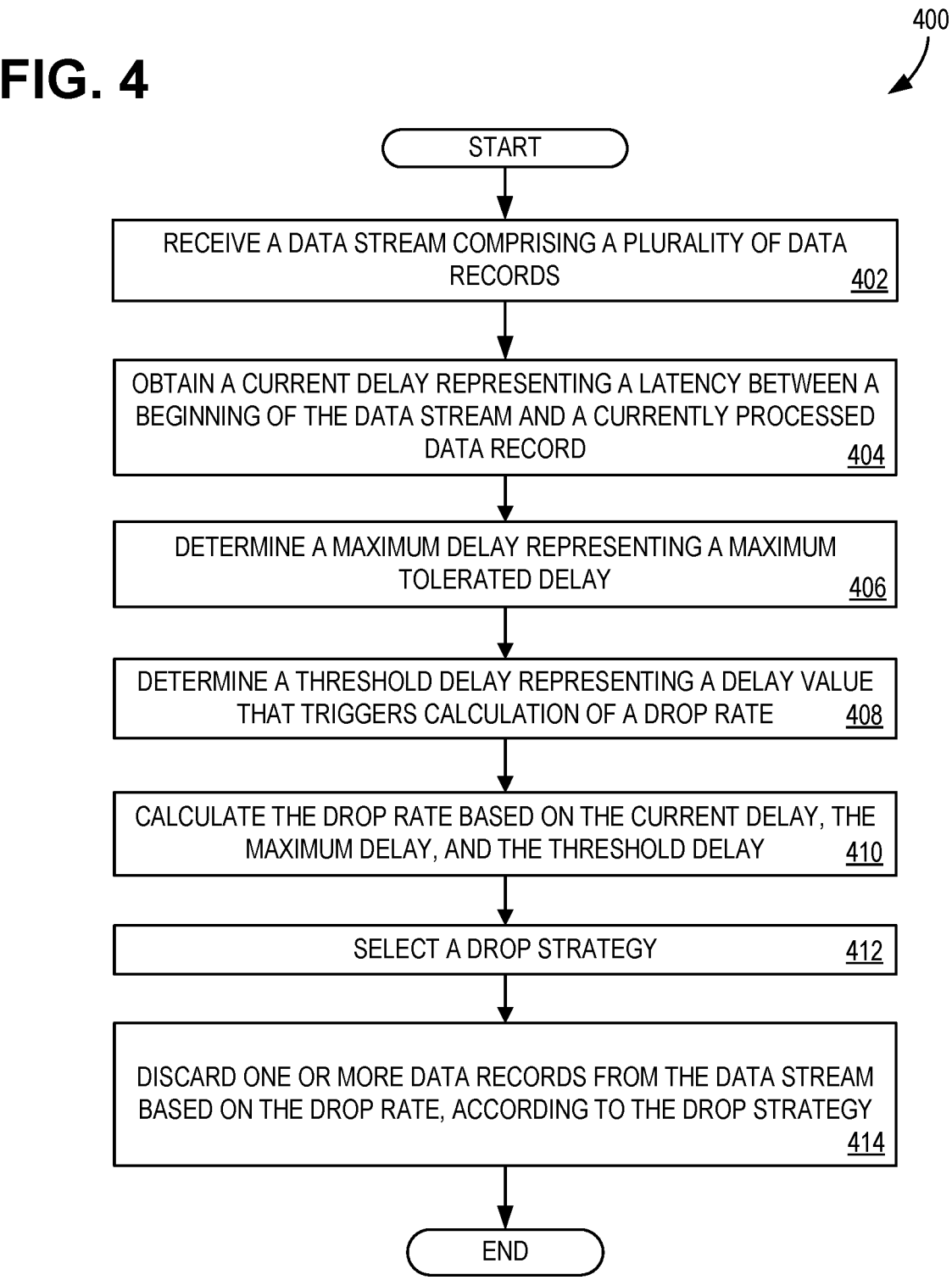
FIG. 4 illustrates a flowchart of exemplary operations for dynamically rate limiting an incoming data stream.

FIG. 4 illustrates a flowchart 400 of exemplary operations for dynamically rate limiting an incoming data stream. At operation 402, a data stream comprising a plurality of data records is received. At operation 404, the current delay 212 is obtained. The current delay 212 represents a latency between a beginning of the data stream and a currently processed data record. At operation 406, the maximum delay 232 is determined. The maximum delay 232 represents a maximum tolerated delay. At operation 408, the threshold delay 222 is determined. The threshold delay 222 is a delay value that triggers calculation of a drop rate. At operation 410, the drop rate is calculated based on the current delay 212, the maximum delay 232, and the threshold delay 222. At operation 412, a drop strategy is selected. At operation 414, one or more data records from the data stream are discarded based on the drop rate, according to the drop strategy.

Figure 5:
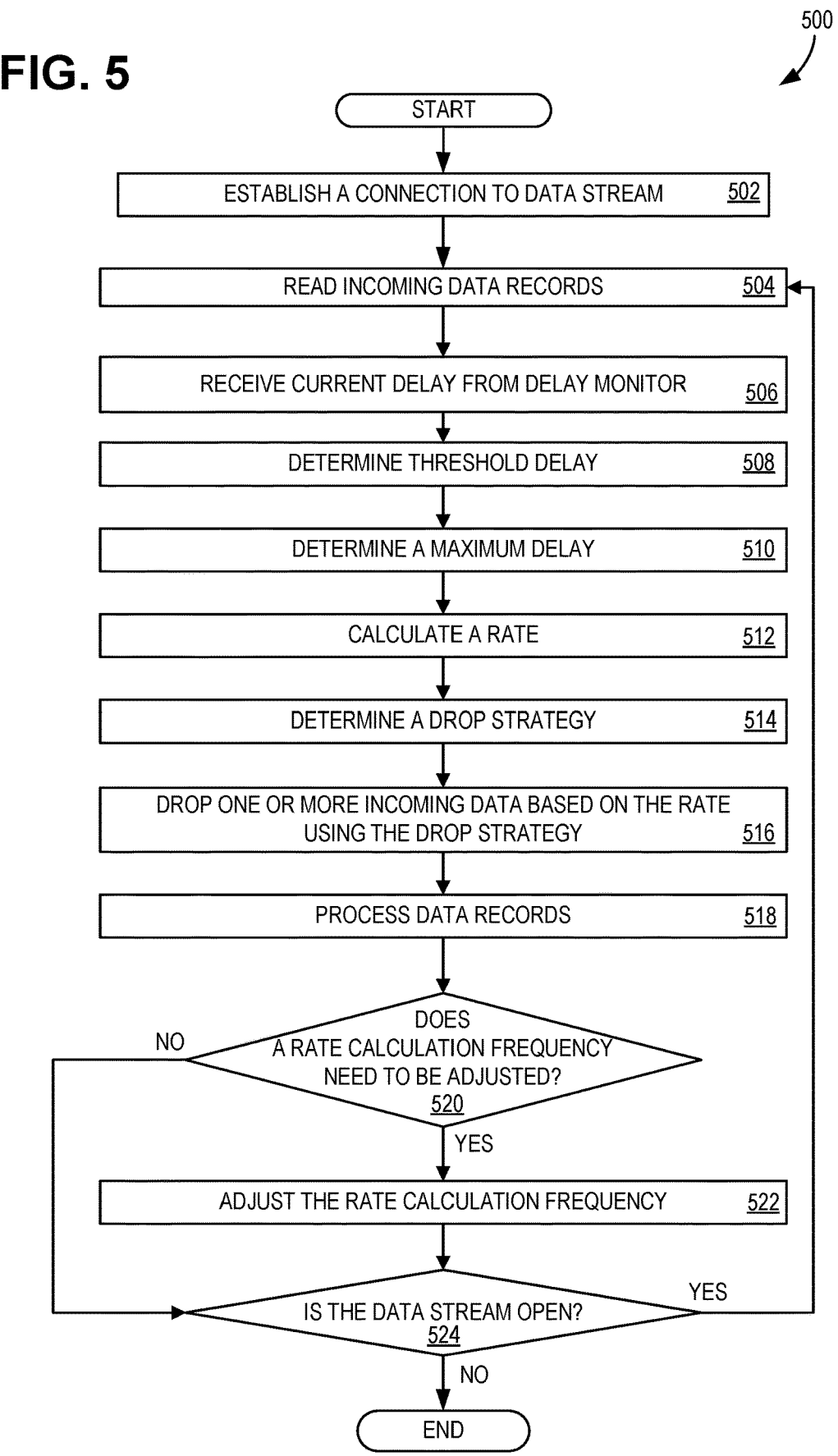
FIG. 5 illustrates a flowchart of exemplary operations associated with an architecture such as that of FIG. 1.

FIG. 5 illustrates a flowchart 500 of exemplary operations associated with providing dynamic rate limiting, as may be performed using examples of architecture 100 and architecture 200. In some examples, the operations of flowchart 500 are performed by one or more computing apparatus 818 of FIG. 8.

Flowchart 500 commences with establishing connection of the data consumer device 150 to data stream 120 in operation 502. Operations 504 through 524 are performed recursively by the data consumer device 150 as long as the data stream 120 is open. In operation 504, after data stream 120 and data consumer device 150 are connected, data consumer device 150 reads incoming data records (e.g., data 122) from data stream 120. In operation 506, current delay 212 is received from propagation delay monitor 210. In operation 508, the threshold determiner 220 sets or determines threshold delay 222. In operation 510, the maximum delay determiner 230 sets or determines the maximum delay 232. In some embodiments, threshold delay 222 and/or maximum delay 232 maintain their values without being redefined.

In operation 512, rate calculator 240 calculates or computes drop rate 242 based on current delay 212, threshold delay 222, and maximum delay 232. In some embodiments, the drop rate 242 is determined based on a ratio of the difference between current delay and threshold delay to the difference between maximum delay and threshold delay. In some embodiments, the drop rate 242 is calculated according to the formula described in relation to FIG. 2. In some embodiments, the drop rate 242 is compared to 100%, and if the drop rate 242 exceeds 100%, which means the maximum delay is reached, the drop rate is set at 100% and all of the incoming data records are dropped. In some embodiments, the drop rate 242 is compared to 0%, and if the rate 242 falls below 0%, which means the current delay 212 has not reached the threshold delay 222, the drop rate is set at 0% and all of the incoming data records are processed. In operation 514, drop event strategy 156 selects or determines the drop strategy to be applied. In some embodiments, user 102 selects a drop strategy, or drop event strategy 156 receives an input from user 102 to set a drop strategy. In some embodiments, a drop strategy is automatically selected based on the data type and/or characteristics of the incoming data records. In some embodiments, ML model 370 is used to select a drop strategy.

In operation 516, one or more data records from the incoming data records are dropped at the drop rate 242 based on the selected drop strategy. In some embodiments, the number of incoming data records is multiplied by drop rate 242 to compute the number of data records to be dropped. In some embodiments, the data records to be discarded are selected at random. In some other embodiments, a filter, such as bloom filter 310, is used to select data records to be discarded. In some embodiments, a trained model (e.g., ML model 370) selects data records to be discarded.

In operation 518, the data records selected to be processed (i.e., the data records which are not dropped) are processed by data processor 158. In decision operation 520, the data consumer device 150 determines whether a rate calculation frequency, or frequency 252, needs to be adjusted based on the delay trend or the amount of change in the drop rate 242 from the previously calculated rate. If the current delay 212 is increasing, or the current drop rate 242 fluctuates significantly from the previous rate, operation 522 adjusts the rate calculation frequency accordingly such that the drop rate 242 is calculated more often. If the drop rate 242 seems mostly steady, the rate calculation frequency 252 is adjusted such that the time between calculations may increase. Otherwise, if the frequency 252 does not need to be adjusted, the process moves to operation 524 without adjusting the frequency 252.

In decision operation 524, the data consumer device 150 checks if the data stream 120 is still open and data records are coming in. If the data stream is open and data records are coming in, the data consumer device 150 reads incoming data records in operation 504. Otherwise, flowchart 500 terminates.

Figure 6:
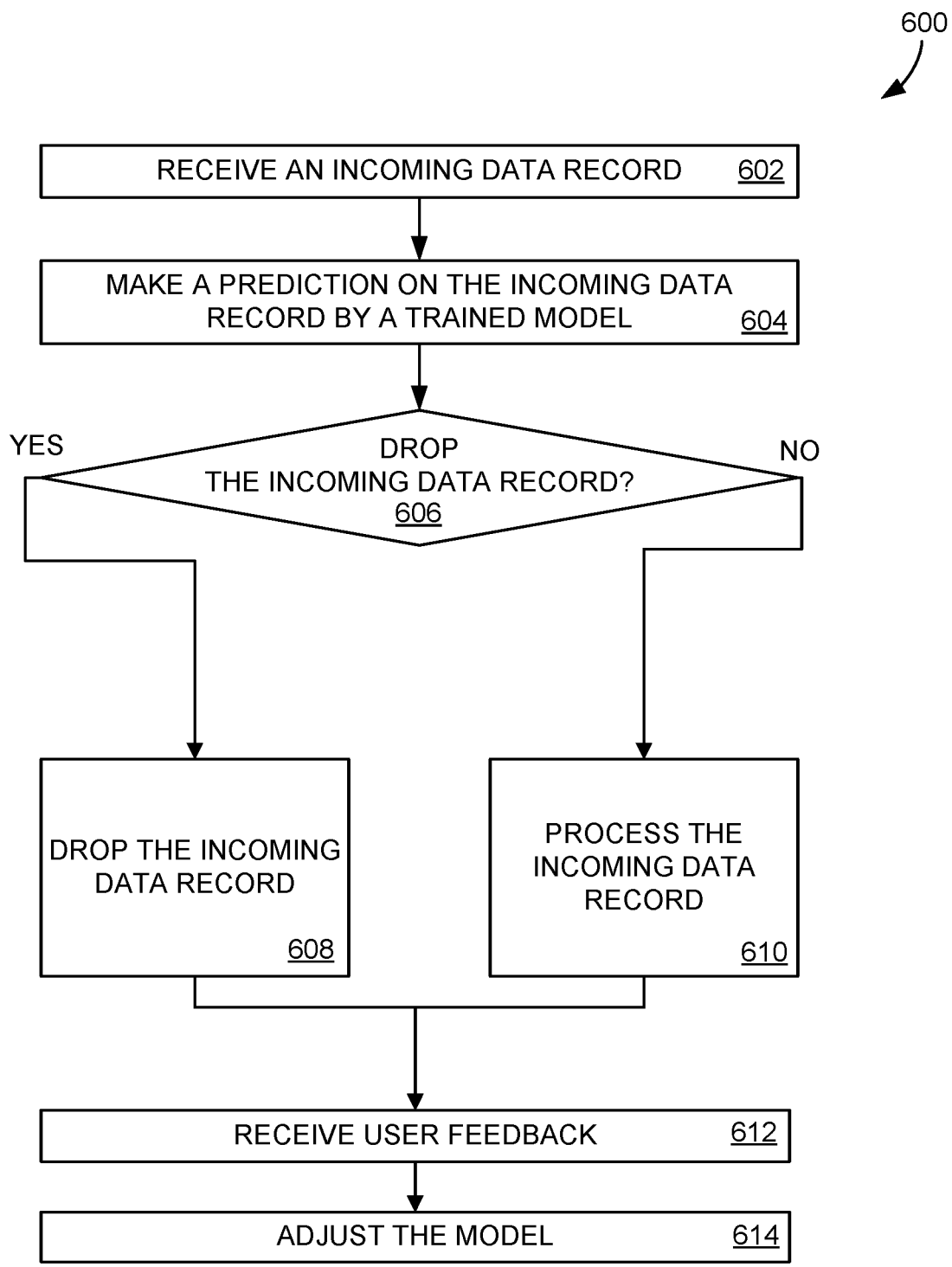
FIG. 6 illustrates a flowchart of exemplary operations associated with selecting data records using a trained model.

FIG. 6 illustrates a flowchart 600 of exemplary operations for determining a selection result of an incoming data record based on a model trained on historical data and user feedback. In some examples, the operations of flowchart 600 are performed by one or more computing apparatus 718 of FIG. 8.

Flowchart 600 commences with receiving an incoming data record in operation 602. In operation 604, a trained model, such as the ML model 370, predicts whether to drop or process the incoming data record. In decision operation 606, based on the prediction made by the trained model, a decision is to be made whether to drop or process the data record. If the decision is made to drop the data record, the selection result of the data record is "Drop", and the data record is dropped in operation 608. Otherwise, the data record has the selection result "Select," and proceeds to be processed in operation 610.

In operation 612, the data consumer device 150 receives feedback from the user 102. The user 102 may select to drop or process the data record in operation 612. The user feedback received in operation 612 is used to adjust the trained model, such as the ML model 370, in operation 614. Operation 614 may further include retraining the model using the user feedback as training data 372.

The ML model 370 is initially trained using historical data records and their selection results (e.g., "Drop" or "Select" for each data record in the historical data records) as training data 372. During and after the training process, the ML model 370 is configured to receive the historical data records, apply a selection map to the historical data records, which includes selection logic that maps the historical data records to their selection result, and determine the selection results to the historical data records based on the application of the selection map. During the training process, the selection map is altered, adjusted, or otherwise changed based on the training data 372, such that, after training is complete, application of the selection map to the historical data records yields selection results that are the same as or at least substantially similar to the selection results associated with the same historical data records in the training data 372. The training of the ML model 370 and associated adjustments made to the ML model 370 may be based on analysis of the training data 372, identification of patterns of the historical data records that are associated with particular responses or types of responses, etc. Further, in some examples, the training of the ML model 370 and adjustment of the ML model 370 is performed using deep learning classification algorithms and/or other machine learning techniques. It should further be understood that the ML model 370, in some examples, operates according to machine learning principles and/or techniques known in the art without departing from the systems and/or methods described herein.

Figure 7:
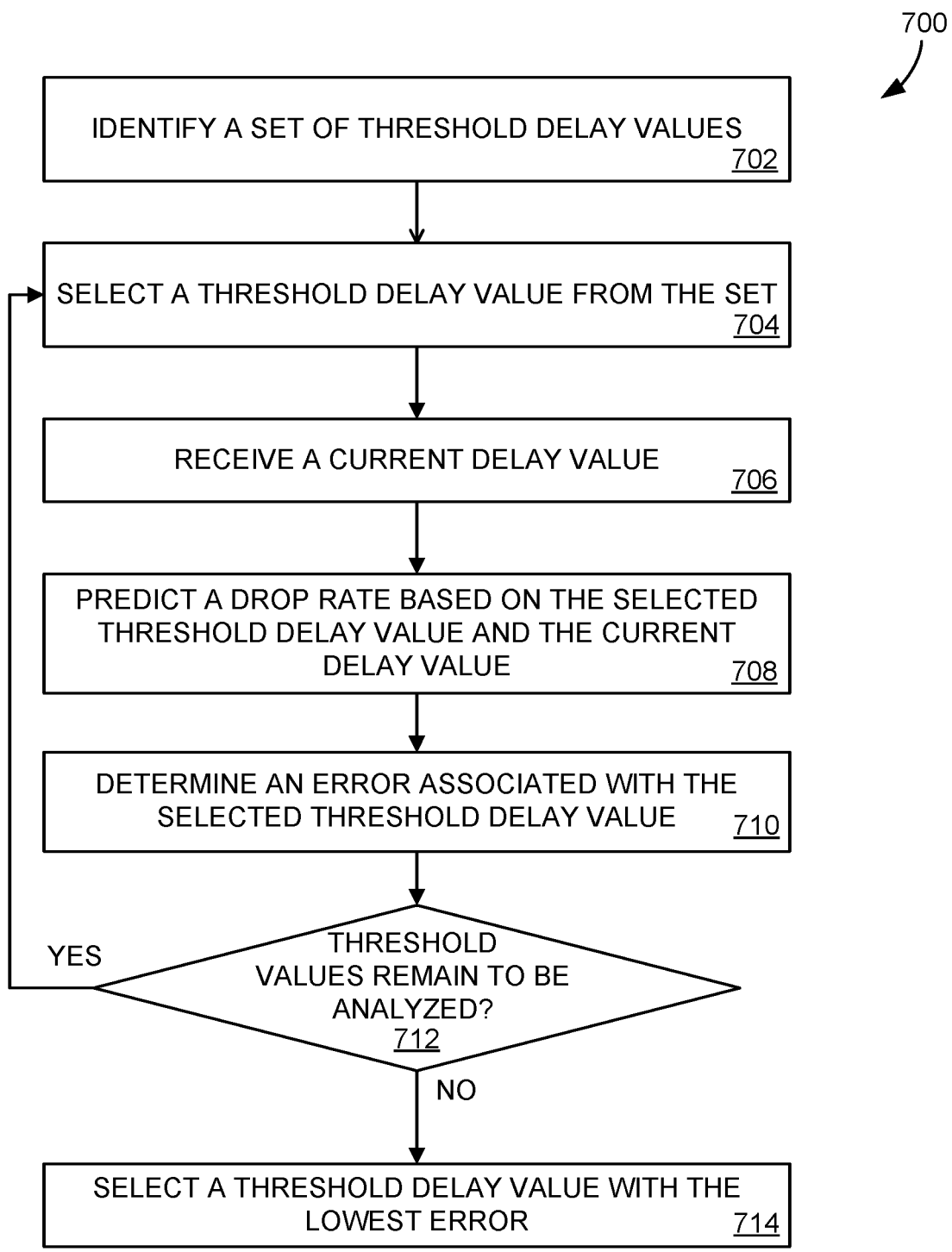
FIG. 7 illustrates a flowchart of exemplary operations associated with defining a threshold using a trained model.

FIG. 7 illustrates a flowchart 700 of exemplary operations for determining a threshold delay (e.g., threshold delay 222) based on a model trained using current delay data (e.g., current delay 212). In some examples, the operations of flowchart 700 are performed by one or more computing apparatus 718 of FIG. 8.

Flowchart 700 commences with identifying a set of potential threshold delay values in operation 702. In some embodiments, identifying the set of potential threshold delay includes accessing a data set of associated drop rates (e.g., historical values of drop rate 242) and a data set of associated current delays (e.g., historical values of current delay 212). In operation 704, a threshold delay value from the set is selected. In operation 706, the current delay 212 is received from the propagation delay monitor 210. In operation 708, a trained model, such as ML model 270, predicts a drop rate based on the selected threshold delay value and the current delay 212.

In operation 710, an error is determined based on the predicted drop rate for the selected threshold value. In decision operation 712, if threshold delay values of the identified set remain to be analyzed, the process returns to 704 to select another threshold delay value. Otherwise, if no threshold delay value remains, the threshold delay determiner 220 defines the threshold delay by selecting the threshold value from the set with the lowest error in operation 714.

ADDITIONAL EXAMPLES

An example method of dynamic rate limiting in a data stream comprises: receiving an incoming data stream, the incoming data stream comprising a plurality of data records; obtaining a current delay, the current delay representing a latency between a beginning of the data stream and a currently processed data record; determining a maximum delay, the maximum delay representing a maximum tolerated delay; determining a threshold delay, the threshold delay representing a delay value that triggers a calculation of a new drop rate; calculating a drop rate based on the current delay, the threshold delay, and the maximum delay, the drop rate representing a percentage of the data records; selecting a drop strategy; and discarding one or more data records from the incoming data stream based on the drop rate, according to the drop strategy.

An example computer system comprising: a processor; and a non-transitory computer-readable medium having stored thereon program code executed by the processor, the program code causing the processor to: receive an incoming data stream, the incoming data stream comprising a plurality of data records; obtain a current delay, the current delay representing a latency between a beginning of the data stream and a currently processed data record; determine a maximum delay, the maximum delay representing a maximum tolerated delay; determine a threshold delay, the threshold delay representing a delay value that triggers a calculation of a new drop rate; calculate a drop rate based on the current delay, the threshold delay, and the maximum delay, the drop rate representing a percentage of the data records; select a drop strategy; and discard one or more data records from the incoming data stream based on the drop rate, according to the drop strategy.

An example non-transitory computer storage medium has stored thereon program code executable by a processor, the program code embodying a method comprising: receiving an incoming data stream, the incoming data stream comprising a plurality of data records; obtaining a current delay, the current delay representing a latency between a beginning of the data stream and a currently processed data record; determining a maximum delay, the maximum delay representing a maximum tolerated delay; determining a threshold delay, the threshold delay representing a delay value that triggers a calculation of a new drop rate; calculating a drop rate based on the current delay, the threshold delay, and the maximum delay, wherein the drop rate represents a percentage of the data records and the drop rate is proportional to a ratio of a difference between the current delay and the threshold delay to a difference between the maximum delay and the threshold delay; selecting a drop strategy; and discarding one or more data records from the incoming data stream based on the drop rate, according to the drop strategy.

Another computer system comprises: a processor; and a non-transitory computer readable medium having stored thereon program code executable by the processor, the program code causing the processor to perform a method disclosed herein. Another example non-transitory computer storage medium has stored thereon program code executable by a processor, the program code embodying a method disclosed herein.

Alternatively, or in addition to the other examples described herein, examples include any combination of the following:
- the drop rate is proportional to a ratio of a difference between the current delay and the threshold delay to a difference between the maximum delay and the threshold delay.
- determining the drop rate exceeds 100%;
- based on the drop rate exceeding 100%, setting the drop rate to 100%; and discarding all events from the incoming data stream;
- determining the drop rate is less than 0%;
- based on the drop rate being less than 0%, setting the drop rate to 0%; and processing all events from the incoming data stream;
- the drop strategy comprises using a bloom filter to select the one or more data records to discard;
- the bloom filter selects the one or more data records to discard based on data significance;
- the drop strategy comprises using a machine learning (ML) model to select the one or more data records to discard;
- the drop strategy comprises selecting one or more data records to discard randomly.
- adjusting a frequency of calculating the drop rate based on the current delay;
- adjusting a frequency of calculating the drop rate based on the drop rate;
- the current delay is obtained from the data stream;
- the threshold delay is set by a machine learning (ML) model;
- the threshold delay is set by a user;
- the maximum delay is set by a machine learning (ML) model;
- the maximum delay is set by a user;
- generating training data from historical data records and selection history;
- training the ML model with the training data;
- the drop strategy is selected from a plurality of drop strategies, the plurality of drop strategies comprising: using a bloom filter, using a machine learning (ML) model, using heuristics, and a random selection.
- the drop strategy is selected by a machine learning (ML) model;

Exemplary Operating Environment

Figure 8:
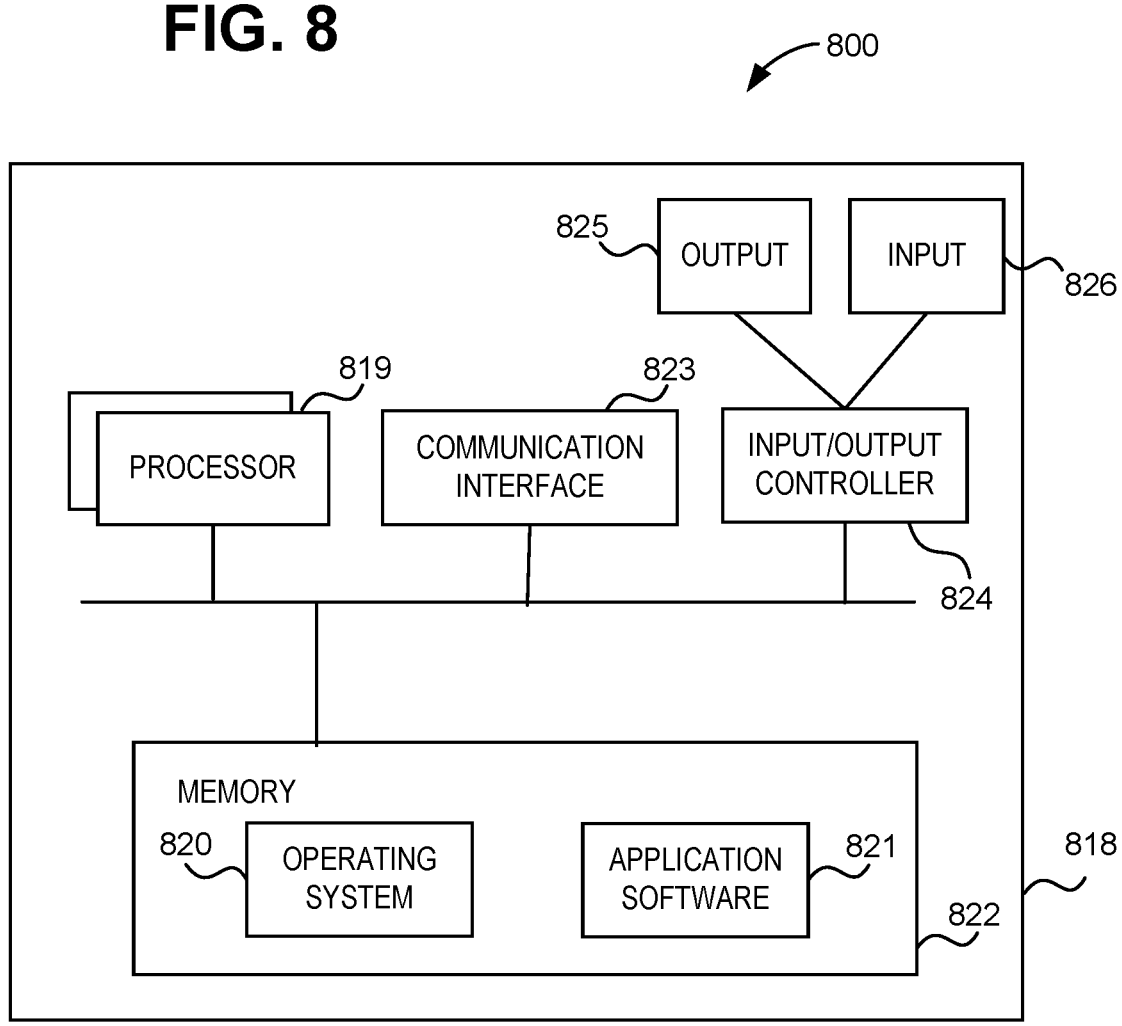
FIG. 8 illustrates a block diagram of an example computing apparatus that may be used as a component of in an architecture such as that of FIGS. 1-3.

The present disclosure is operable with a computing device (computing apparatus) according to an embodiment shown as a functional block diagram 800 in FIG. 8. In an embodiment, components of a computing apparatus 818 may be implemented as part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hardcoded machine. Platform software comprising an operating system 820 or any other suitable platform software may be provided on the computing apparatus 818 to enable application software 821 to be executed on the device. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, hard disks, RAM, ROM, EPROM, EEPROM, NVMe devices, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium (e., non-transitory) that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g. using a communication interface 823). Computer storage media are tangible, non-transitory, and are mutually exclusive to communication media.

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g. a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
  receiving, at a data consumer comprising a first computing device, a data stream from a data producer on a second computing device, the data stream comprising a plurality of data records;
  measuring, with the data consumer, a propagation delay in the data consumer causing backpressure on the data stream, the propagation delay comprising a processing delay in the data consumer and representing a difference in a first rate at which the data producer produces the plurality of data records and a second rate at which the data consumer consumes the plurality of data records;
  determining, with the data consumer, a maximum tolerated delay;
  determining, with the data consumer, a threshold delay representing a delay value that triggers calculation of a drop rate;
  calculating, with the data consumer, the drop rate based on the backpressure delay, the maximum delay, and the threshold delay, the drop rate representing a percentage of the data records;
  selecting, with the data consumer, a drop strategy; and
  discarding, with the data consumer, one or more data records from the data stream based on the drop rate, according to the drop strategy.

2. The computer-implemented method of claim 1, wherein the drop rate is proportional to a ratio of a difference between the propagation delay and the threshold delay to a difference between the maximum delay and the threshold delay.

3. The computer-implemented method of claim 2, further comprising:
 determining the drop rate exceeds 100%;
 based on the drop rate exceeding 100%, setting the drop rate to 100%; and
 discarding all data records from the data stream.

4. The computer-implemented method of claim 2, further comprising:
 determining the drop rate is less than 0%;
 based on the drop rate being less than 0%, setting the drop rate to 0%; and
 processing all data records from the data stream.

5. The computer-implemented method of claim 1, wherein the drop strategy comprises using a bloom filter to select the one or more data records to discard.

6. The computer-implemented method of claim 1, wherein the drop strategy comprises using a machine learning model to select the one or more data records to discard.

7. The computer-implemented method of claim 1, further comprising adjusting a frequency of calculating the drop rate based on the propagation delay.

8. The computer-implemented method of claim 1, wherein the threshold delay is set by a machine learning model.

9. A computer system comprising:
 a processor; and
 a non-transitory computer-readable medium having stored thereon program code executed by the processor, the program code causing the processor to:
 receive, at a data consumer on comprising a first computing device, a data stream from a data producer on a second computing device, the data stream comprising a plurality of data records;
 measure, with the data consumer, a propagation delay in the data consumer causing backpressure on the data stream, the propagation delay comprising a processing delay in the data consumer and representing a difference in a first rate at which the data producer produces the plurality of data records and a second rate at which the data consumer consumes the plurality of data records;
 determine, with the data consumer, a maximum tolerated delay;
 determine, with the data consumer, a threshold delay representing a delay value that triggers calculation of a drop rate;
 calculate, with the data consumer, the drop rate based on the propagation current delay, the maximum delay, and the threshold delay, the drop rate representing a percentage of the data records;
 select, with the data consumer, a drop strategy; and
 discard, with the data consumer, one or more data records from the data stream based on the drop rate, according to the drop strategy.

10. The computer system of claim 9, wherein the drop rate is proportional to a ratio of a difference between the propagation delay and the threshold delay to a difference between the maximum delay and the threshold delay.

11. The computer system of claim 10, wherein the program code is further operative to:
 determine whether the drop rate exceeds 100%;
 based on the drop rate exceeding 100%, set the drop rate to 100%; and
 discard all data records from the incoming data stream.

12. The computer system of claim 10, wherein the program code is further operative to:
 determine the drop rate is less than 0%;
 based on the drop rate being less than 0%, set the drop rate to 0%; and
 process all data records from the incoming data stream.

13. The computer system of claim 9, wherein the drop strategy comprises using a bloom filter to select the one or more data records to discard.

14. The computer system of claim 9, wherein the drop strategy comprises using a machine learning model to select the one or more data records to discard.

15. The computer system of claim 9, wherein the program code is further operative to adjust a frequency of calculating the drop rate based on the current propagation delay.

16. The computer system of claim 9, wherein the threshold delay is set by a machine learning model.

17. A non-transitory computer storage medium having stored thereon program code executable by a processor to perform a method comprising:
 receiving, at a data consumer comprising a first computing device, a data stream from a data producer on a second computing device, the data stream comprising a plurality of data records;
 measuring, with the data consumer, a propagation delay in the data consumer causing backpressure on the data stream, the propagation delay comprising a processing delay in the data consumer and representing a difference in a first rate at which the data producer produces the plurality of data records and a second rate at which the data consumer consumes the plurality of data records;
 determining, with the data consumer, a maximum tolerated delay;
 determining, with the data consumer, a threshold delay representing a delay value that triggers calculation of a drop rate;
 calculating, with the data consumer, the drop rate based on the backpressure delay, the maximum delay, and the threshold delay, the drop rate representing a percentage of the data records;
 selecting, with the data consumer, a drop strategy; and
 discarding, with the data consumer, one or more data records from the data stream based on the drop rate, according to the drop strategy.

18. The computer storage medium of claim 17, wherein the drop strategy comprises using a bloom filter to select the one or more data records to discard.

19. The computer storage medium of claim 17, wherein the drop strategy comprises using a machine learning model to select the one or more data records to discard.

20. The computer storage medium of claim 17, wherein the threshold delay is set by a machine learning model.

* * * * *